United States Patent [19]
Kjosness et al.

[11] Patent Number: 4,876,520
[45] Date of Patent: * Oct. 24, 1989

[54] COAXIAL SWITCHING SYSTEM WITH SWITCHED SHIELDS AND CROSSTALK SUPPRESSION

[75] Inventors: David P. Kjosness, Longmont; Joe E. Marriott, Loveland, both of Colo.

[73] Assignee: Hewlett-Packard Company, Palo Alto, Calif.

[*] Notice: The portion of the term of this patent subsequent to Aug. 23, 2005 has been disclaimed.

[21] Appl. No.: 187,101

[22] Filed: Apr. 28, 1988

Related U.S. Application Data

[62] Division of Ser. No. 79,568, Jul. 30, 1987, Pat. No. 4,766,401.

[51] Int. Cl.$^4$ .......................... H04B 3/28; H01P 1/12
[52] U.S. Cl. ........................................ 333/12; 333/262
[58] Field of Search ...................... 333/1, 12, 101, 105, 333/262; 335/4, 5; 200/153 S; 340/825.79, 825.83

[56] References Cited

U.S. PATENT DOCUMENTS 3,588,410  6/1971  Guraydin et al. ............... 200/153 S
3,681,612  8/1972  Vogl et al. ......................... 333/12 X Primary Examiner—Paul Gensler
Attorney, Agent, or Firm—Edward L. Miller

[57] ABSTRACT

A switching network for coaxial transmission lines switches both the center conductors and the shields to allow floating measurements and eliminate the effects of ground loops. The shields are switched even though the coaxial relays use to switch the center conductors do not themselves also switch the shields. This is accomplished by using two coaxial relays having connected center conductors, each of which coaxial relay is itself shielded, and a third relay to selectively connect and disconnect the shields of the coaxial relays. All three relays open and close in unison. Although this arrangement provides excellent isolation when open within the circuit where it is used, there is unfortunately a coupling mechanism between pairs of such circuits having such relay arrangements that are closed. This coupling mechanism produces crosstalk between such pair of circuits. The crosstalk current tends to flow in a resonant circuit. Both the resonant peak of the crosstalk current and its non resonant magnitude can be reduced by the inclusion of magnetic cores (such as lossy ferrites) around the coaxial transmission lines as they enter and leave the coaxial relays.

1 Claim, 5 Drawing Sheets

COAXIAL SWITCHING SYSTEM WITH SWITCHED SHIELDS AND CROSSTALK SUPPRESSION

CROSS REFERENCE TO RELATED PATENT

This Patent is: (1) a division of U.S. Pat. No. 4,766,401 filed on 30 July 1987, Ser. No. 079,568, issued to Kjosness and Marriott on 23 August 1988 and assigned to Hewlett-Packard Co. of Palo Alto, California; and (2) also assigned to Hewlett-Packard Co. by the same instrument, which is recorded on Reel 4748 at Frames 574 and 575.

BACKGROUND AND SUMMARY OF THE INVENTION

Certain test and measurement systems incorporate a switching mechanism that allows any one of perhaps several pieces of test equipment to be connected to any one of perhaps several devices under test. Commonly encountered switching topologies include matrices and multiplexers. The test equipment may include sources such as power supplies and oscillators, and measurement devices such as voltmeters and analyzers. It is common in such systems to use coaxial cable to interconnect the test equipment and the devices under test. Many types of measurements require that both the center conductor and the shield of the coaxial interconnection be disconnected when a switch is opened, just as if an actual coaxial connector were being removed. Examples include floating measurements and ground loop elimination.

It is not common for a coaxial relay to switch both the center conductor and the shield; most switch only the center conductor. A low cost way to approximate the action of a coaxial connector with conventional coaxial relays would be desirable. This may be accomplished through the use of two coaxial relays and a third relay. Each coaxial relay is connected to one of the coaxial cables to be switched: the center conductor of each coaxial cable is connected to the center conductor of its associated coaxial relay and the shield of each coaxial cable is connected to the shield of its associated coaxial relay. The remaining center conductor terminals of the coaxial relays are connected together directly, but the shields of the two coaxial relays are connected through the third relay. All three relays open and close together. Thus the coaxial switching mechanisms are each fully shielded, whether the coaxial relays are opened or closed, yet the coaxial shields are separated when the coaxial relays are opened.

The three-relay configuration described above achieves excellent isolation when open, but is unfortunately susceptible to certain crosstalk mechanisms between pairs of closed such three-relay configurations. The crosstalk may be adequately suppressed by the use of properly placed ferrite cores to form common mode chokes.

DESCRIPTION OF A PREFERRED EMBODIMENT

Figure 1:
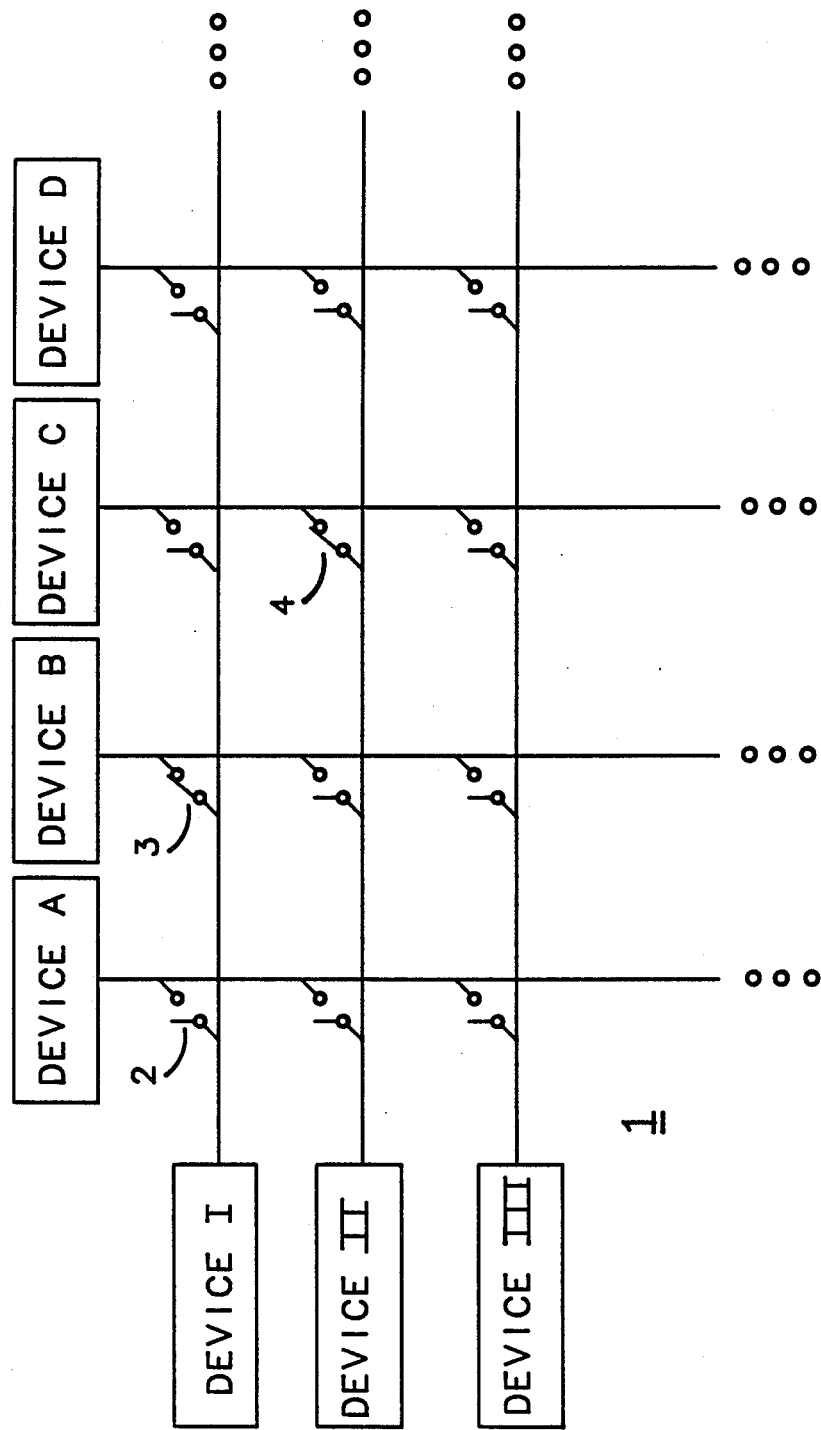
FIG. 1 is a simplified block diagram of a coaxial switching system for interconnecting a variety of test equipment and devices under test, and to which the invention is applicable.

Refer now to FIG. 1, wherein is shown a simplified matrix 1 of switches for interconnecting a variety of devices whose frequency range may extend from DC to several hundred megahertz. The matrix 1 is composed of rows and columns, and in the present example devices I-III are connected to the rows, while devices A-D are connected to the columns. The interconnecting conductors are transmission lines; e.g., coaxial cable, strip lines or micro-strips on a printed circuit board. The various switches (of which 2, 3 and 4 are examples) allow any column device to be connected to any row device. In the example all but switches 3 and 4 are open. The closure of switch 3 connects device 1 to device B, while the closure of switch 4 connects device II to device C. FIG. 1 is, of course, principally a point of departure for examining the nature of a certain coaxial switching technique. Those skilled in the art will appreciate that the invention to be described is applicable to other switching topologies, such as scanners and multiplexers. Nor is there any implication that only sources to be measured can be connected to columns while measuring equipment is connected to rows; any equipment can be connected in any way that makes sense for the application at hand. In a typical application the switching is controlled by a programmable mechanism (e.g., a computer of some sort) and may involve fairly complicated high speed sequences of device interconnection.

Figure 2:
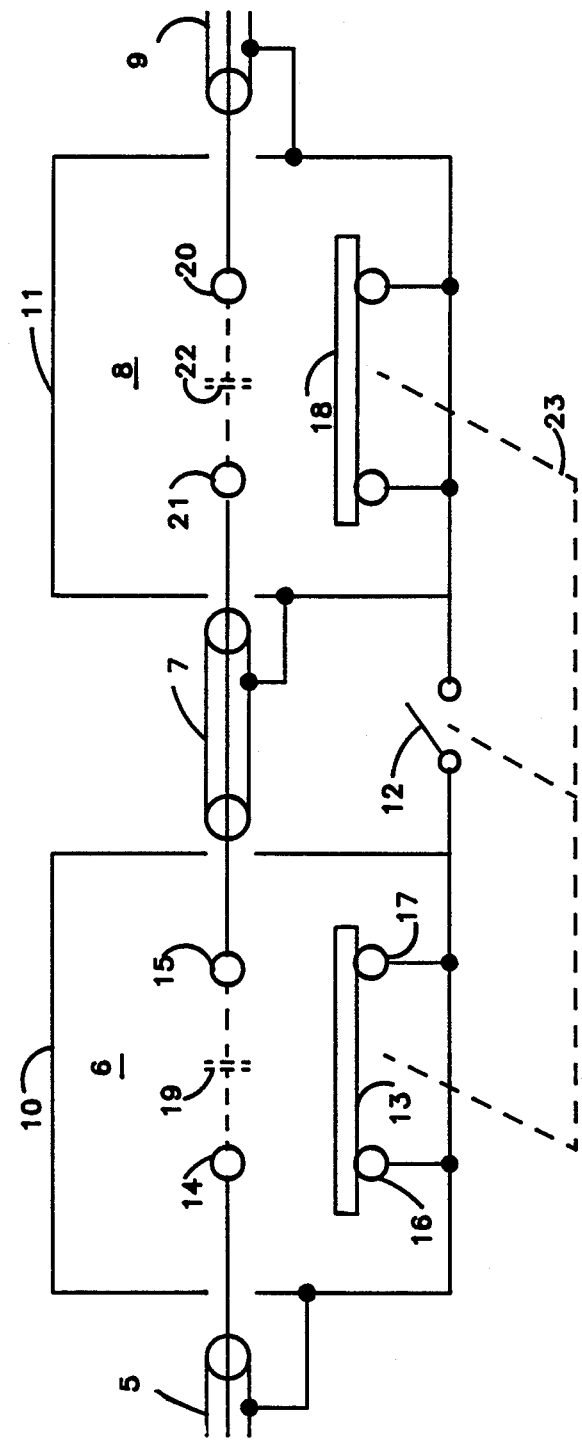
FIG. 2 is a diagram illustrating a preferred configuration of two coaxial relays for switching the center conductor in a coaxial transmission line and one other relay for switching the shield, and which may be used in a switching system such as the one of FIG. 1.

As mentioned in the Background and Summary, it is very desirable that the switches open and close *both* the center conductor and the shield of the coaxial transmission line. FIG. 2 shows how this end can be achieved using elements found in conventional relays.

Turning now to FIG. 2, observe that there is shown an arrangement for connecting and disconnecting two coaxial transmission lines 5 and 9. Coaxial transmission line 5 enters a coaxial relay 6, which is in turn connected by a short length of transmission line 7 to another coaxial relay 8. Coaxial relay 8 is connected to another transmission line 9. The signal switching mechanisms within coaxial relays 6 and 8 are respectively shielded by shields 10 and 11, and when closed approximate the characteristic impedance of the transmission lines 5, 7 and 9. The shield of transmission line 5 is connected to the shield 10 of relay 6, and the shield of transmission line 9 is connected to the shield 11 of relay 8. The shield of transmission line 7 is connected to the shield 11 of relay 8, but not to the shield 10 of relay 6. (It could be the other way around. The shield of transmission line 7 could be connected to the shield 10 of relay 6, but not to the shield 11 of relay 8. The choice is arbitrary.) It should also be noted that if the length of transmission line 7 were sufficiently short, then it could be eliminated in favor of an unshielded connection.

A relay 12 connects the shields 10 and 11 whenever the relays 6 and 8 are closed. This is, all three relays 6, 8 and 12 open and close in unison. This relationship is indicated by dotted line 23. It will be understood, however, that the relationship will, in most embodiments, be a logical one rather than one where three sets of relay contacts are actuated by the common physical motion of one armature.

Inside each of relays 6 and 8 are conductive moveable contacts 13 and 18; the means for moving those contacts have been omitted. Relay 6 is closed by moving movable contact 13 upwards to bear against contacts 14 and 15. This shorts contacts 14 and 15 together, thus connecting the center conductor of transmission line 5 to that of transmission line 7. When the relay 6 is open the moveable contact 13 is pulled down against contacts 16 and 17, thereby becoming connected to the shield 10. A similar set of actions occur inside relay with regard to the shorting and opening of contacts 20 and 21.

There are several important things to notice about the arrangement shown in FIG. 2. Among these is that the center conductors remain fully shielded at all times, even though the shields of the relays do not remain electrically connected together when the relays 6, 8 and 12 are opened. Another advantage of the arrangement of FIG. 2 is the extra high isolation obtained between the center conductors of transmission lines 5 and 9. This arises because of the independent shielding of each of the center conductor contacts 14 and 20 from the other, and because the stray capacitances 19 and 22 are very small. A related property, and very important for the isolation between transmisson lines 5 and 9, is that there is no significant coupling from shield 10 to the center conductor of transmission line 9, and no significant coupling from the shield 11 to the center conductor of transmission line 5. Such isolation contributes to the maintenance of good common mode rejection of the measurement equipment.

It will be appreciated by those skilled in the art that the use of actual relays 6 and 8 is not required, but that the benefits of the arrangement of FIG. 2 can be obtained while using manually operated coaxial switches, such as are often used as "antenna switches." Likewise, the relay 12 could be replaced by any suitable manual switch.

Figure 3:
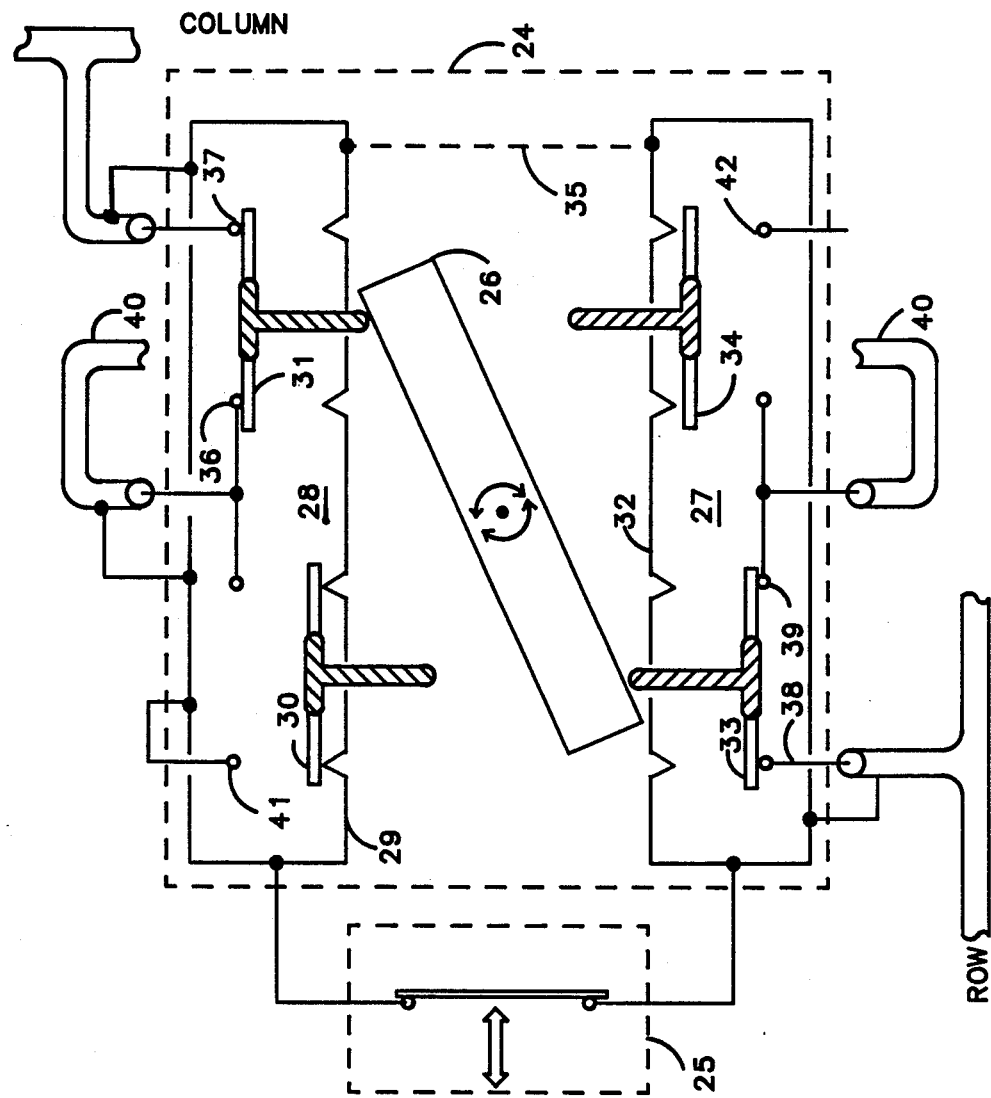
FIG. 3 is a diagram illustrating the internal operation of a modified commercially available double-pole double-throw coaxial relay useable in the preferred configuration of FIG. 2 for implementing the switching system of FIG. 1.

Refer now to FIG. 3, which includes a simplified illustration of the internal structure of one commercially available coaxial relay that is suitable for use with the invention; the style RG 2 relay available from the Aromat Corp., of New Providence, New Jersey. FIG. 3 may be viewed as an expansion of a coaxial switch in FIG. 1, or as an elaboration of FIG. 2.

According to FIG. 3 a double-pole double-throw coaxial relay 24 includes two single-pole double-throw sections 27 and 28 respectively shielded by shields 32 and 29. Sections 27 and 28 correspond generally to relays 6 and 8 of FIG. 2, and shields 32 and 29 correspond to shields 10 and 11, although various differences will become apparent as the description proceeds. Relay 25 of FIG. 3 serves the same function as relay 12 of FIG. 2; it makes and breaks a connection between the shields 29 and 32.

The Aromat RG2 is ordinarily supplied with a conductive strap permanently connecting shields 29 and 32 together. The electrical presence of this strap is indicated by dotted line 35. It will be noted, however, that the presence of such a strap would render moot any action of relay 25, and defeat the object of switching the connection between the shields of the coaxial transmission lines. Accordingly, the Aromat RG2 is modified before use; the strap represented by dotted line 35 is removed. In a preferred embodiment a switching matrix was made from relays that never had the strap in the first place; the relay's manufacturer omitted it at the inventor's request.

An oscillating armature 26 actuates two opposing pairs of moveable contacts 31/33 and 30/34. The means for rotating the armature 26 is known in itself, and has been omitted. When, as shown in the figure, the armature 26 moves movable contact 31 upwards against fixed contacts 36 and 37, a simultaneous motion moves movable contact 33 against fixed contacts 38 and 39. This shorts contact 37 to 36, and contact 39 to 38. A short length of coaxial transmission line 40 (corresponding to 7 in FIG. 2) connects contact 36 with contact 39. Thus in the position shown, contact 37 is electrically connected to contact 38. This establishes a connection between a row and a column of the matrix 1. Note that the shield of transmission line 40 is not connected to both shields 29 and 32; it is connected to only one. As with FIG. 2 and the shield of transmission line 7, the choice of to which one the connection is made is arbitrary.

At the same time that armature 26 moved to the position shown in FIG. 3, relay 25 was closed. That connected shield 29 to shield 32.

It will be noted that the double-pole double-throw relay 24 of FIG. 3 is not, strictly speaking, identical to the pair of relays 6 and 8 shown in Figure 2. Relay 24 has an extra pair of poles, and a decision is required as to their disposition. In FIG. 3 these poles comprise contacts 41 and 42. There are several choices, of which the figure shows one. Contacts 41 and 42 could be both left open, or one could be left open and the other connected to its associated shield. One choice must be avoided, however. That choice is connecting both contacts 41 and 42 to their associated shield; to do so would defeat the electrical separation of the shields 29 and 32 when the connection between the center conductors is opened.

Of the choices listed above one may provide an advantage over the others, depending upon the circumstances. The configuration shown in FIG. 3 offers the following property: coupling from the shield 32 to center conductor contact 37 is less than the coupling from shield 29 to center conductor contact 38. If better isolation in the other direction were desired, then contact 41 should be left open and contact 42 connected to shield 32.

As mentioned in the Background and Summary, the relay configurations of FIGS. 2 and 3 are susceptible to crosstalk between circuits having closed relays. The mechanisms by which the crosstalk originates is explained in connection with FIG. 4.

Figure 4:
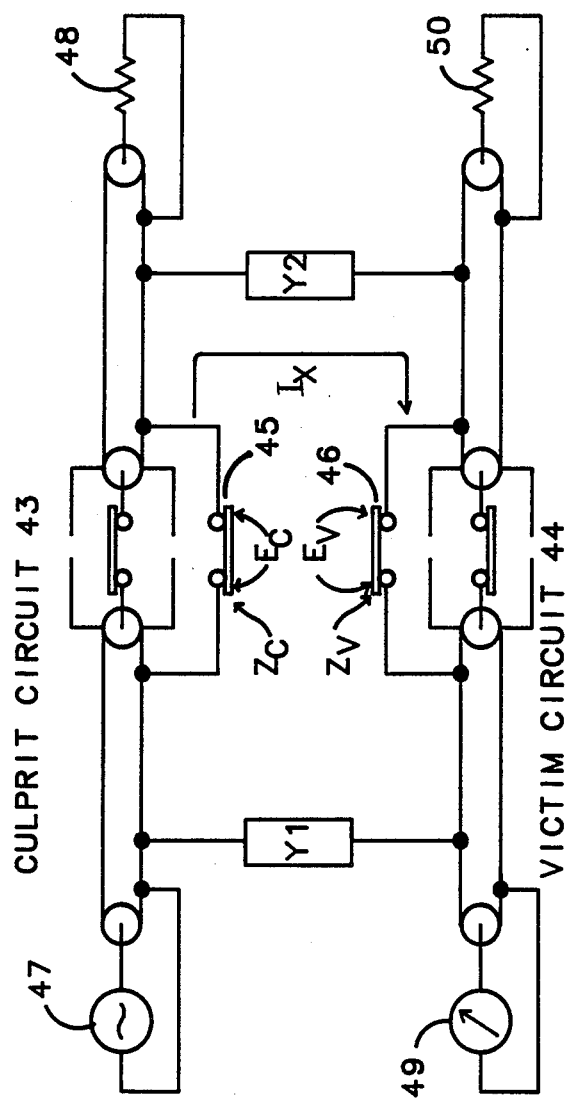
FIG. 4 is a diagram illustrating the mechanism by which crosstalk orginates in the switching system of FIGS. 1-3.

FIG. 4 illustrates a culprit circuit 43 and a victim circuit 44. By this we mean that the culprit circuit produces an undesired signal in victim circuit 44. Actually, the roles are not separate, and the victim can simultaneously be a culprit for other circuits, including any for which it is also a victim. We have chosen to show a single culprit and an isolated victim for each of analysis.

If there is to be crosstalk between two circuits then there must be some coupling between them. In FIG. 4 this coupling is indicated as lumped admittances Y1 and Y2, although it will be understood that in reality the admittances are physically distributed. These admittances may arise in a variety of ways, including the bundling of cables along common paths between devices, and unwanted coupling between the devices themselves.

The culprit circuit 43 includes a generator 47 that produces a current that flows through the coaxial transmission lines of the circuit to a load 48. The victim circuit 44 is similar, except that for ease of analysis it includes a measuring device 49 in place of a generator. Thus, any signal measured by the measuring device 49 will be the crosstalk. Included in the transmission lines are coaxial switching arrangements such as described in connection with FIGS. 2 and 3. In particular, switches 45 and 46 correspond to instances of relay 12 in FIG. 2 or relay 25 in FIG. 3.

Switches 45 and 46 appear as impedances $Z_c$ and $Z_v$ to their respective circuits. This occurs principally because the properties of the transmission lines have been disturbed, and not merely because of any defects in the relays. (A bad choice for a relay might make things worse, but even a perfect relay would not eliminate the problem.) In particular, the path of the applied center conductor current in the coaxial relay and the path of the return current in the shield-to-shield connection no longer canel each others' magnetic fields, thus creating inductive impedances $Z_c$ and $Z_v$. $Z_c$ will be instrumental in developing a signal in the culprit circuit 43 that is communicated to victim circuit 44, where it will be felt across $Z_v$.

Two things follow from the existence of $Z_c$. First, current flowing in the culprit circuit 43 creates a voltage $E_c$ across $Z_c$. Second, a current $I_x$ flows through the loop composed of Y2, $Z_v$, Y1 and $Z_c$. The voltage $E_c$ may be thought of as the driving potential for $1_x$. Alternatively, the current in the shield of the culprit circuit 43 can thought of as dividing between $Z_c$ and the admittances. Both analyses are valid, and they are equivalent.

The crosstalk current $1_x$ developes a voltage $E_x$ across impedance $Z_v$ in the victim circuit 44. That in turn causes a current to flow in victim circuit 44 which registers upon measuring device 49. The reading obtained from device 49 is the manifestation of the crosstalk.

Admittances Y1 and Y2 will generally be capacitive, although exceptions are conceivable. The current $I_x$ that flows in the shields of the culprit and victim transmission lines has no equal and opposite current flowing in the center conductors. As a result, those shields appear inductive to $I_x$. These reactances combine to make the path for $I_x$ be a series resonant circuit. The actual value of the resonant frequency will depend upon many specific aspects of the particular system at hand. In a particular embodiment resonances from 5 MHz to over 20 MHz were measured.

Figure 5:
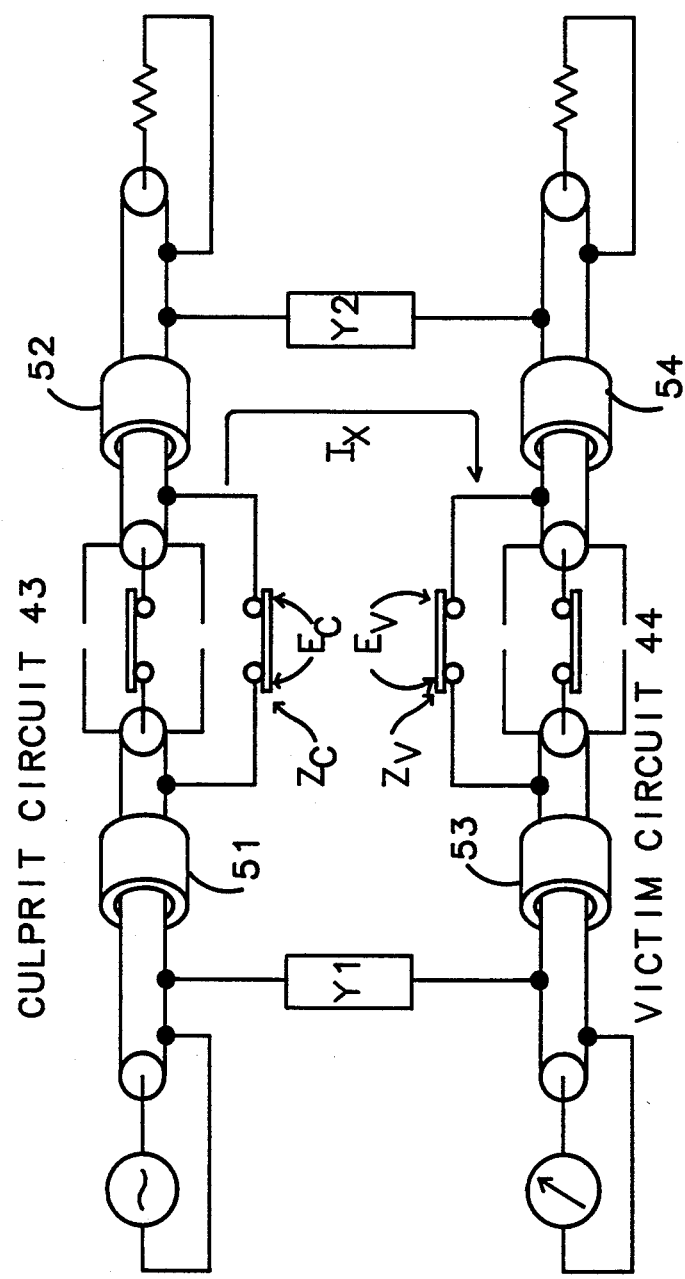
FIG. 5 is a diagram illustrating a way to suppress the crosstalk of FIG. 4.

FIG. 5 shows the same two culprit and victim circuits 43 and 44 as appeared in FIG. 4. It also shows how the crosstalk current $I_x$ can be reduced. This is accomplished by the placement of magnetic cores 51-54 over the coaxial transmission lines in close proximity to where they enter and leave the coaxial relays. Four cores are shown, but it should be noted that even a single core placed at any one of the four locations will contribute to crosstalk reduction, as the crosstalk current $I_x$ must go through *each* of the four locations shown. Of course, more than one core could be placed at each location, if that were desired. The object of the one or more cores is to place an additional impedance in series with $I_x$. In the preferred embodiment the magnetic cores 51-54 are ferrite cores that exhibit resistive impedance. The cores were deliberately chosen to be lossy. They couple crosstalk energy out of the crosstalk loop into the cores themselves, thus loading the resonant crosstalk circuit. This has the beneficial results of: (1) reducing or almost eliminating the resonant peak of $I_x$; and, (2) reducing the amplitude of $I_x$ at all frequencies, not just at that of resonance. The reduction in amplitude of $I_x$ reduces the amount of crosstalk, and thereby its effects.

Another way of reducing $I_x$ is to wrap a section of coaxial transmission line around a rod of ferrite or other magnetic material. Any suitable means of producing a common mode choke may be employed.

We claim:

1. A circuit for switching transmission lines comprising:

first and second segments of a first transmission line having a center conductor and a shield;

a first coaxial relay having first and second center conductor and shield contacts, the first center conductor and shield contacts respectively coupled to the center conductor and shield of the first segment of the first transmission line;

a second coaxial relay having first and second center conductor and shield contacts, the second center conductor and shield contacts respectively coupled to the center conductor and shield of the second segment of the first transmission line;

a first section of interconnecting transmission line having a center conductor and a shield, at one end of the first section the center conductor being connected to the second center conductor contact of the first coaxial relay and the shield being connected to the second shield contact of the first coaxial relay, and at the other end of the first section the center conductor being connected to the first center conductor contact of the second coaxial relay, and the shield of the first section being left unconnected to the second shield contact of the second coaxial relay;

a first relay means, coupled to the shield contacts of the first and second coaxial relays, for electrically connecting those shield contacts together whenever the first and second coaxial relays are closed;

first and second segments of a second transmission line having a center conductor and a shield;

a third coaxial relay having first and second center conductor and shield contacts, the first center conductor and shield contacts respectively coupled to the center conductor and shield of the first segment of the second transmission line;

a fourth coaxial relay having first and second center conductor and shield contacts, the second center conductor and shield contacts respectively coupled to the center conductor and shield of the second segment of the second transmission line;

a second section of interconnecting transmission line having a center conductor and a shield, at one end of the second section the center conductor being connected to the second center conductor contact of the third coaxial relay and the shield being connected to the second shield contact of the third coaxial relay, and at the other end of the second section the center conductor being connected to the first center conductor contact of the fourth coaxial relay, and the shield of the second section being left unconnected to the second shield contact of the fourth coaxial relay; and a second relay means, coupled to the shield contacts of the third and fourth coaxial relays, for electrically connecting those shield contacts together whenever the third and fourth coaxial relays are closed.

* * * * *